US011385042B2

(12) United States Patent
Uchida et al.

(10) Patent No.: US 11,385,042 B2
(45) Date of Patent: Jul. 12, 2022

(54) POSITION DETECTION DEVICE (71) Applicant: DENSO CORPORATION, Kariya (JP)

(72) Inventors: Takuma Uchida, Kariya (JP); Takamitsu Kubota, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 17/038,570

(22) Filed: Sep. 30, 2020

(65) Prior Publication Data

US 2021/0010792 A1 Jan. 14, 2021

Related U.S. Application Data (63) Continuation of application No. PCT/JP2019/011424, filed on Mar. 19, 2019.

(30) Foreign Application Priority Data

Apr. 3, 2018 (JP) .............................. JP2018-071471

(51) Int. Cl.
*G01B 7/00* (2006.01)
*G01D 5/14* (2006.01)
*G01D 11/24* (2006.01)

(52) U.S. Cl.
CPC ............. *G01B 7/003* (2013.01); *G01D 5/145* (2013.01); *G01D 11/245* (2013.01)

(58) Field of Classification Search
CPC . G01B 7/00; G01B 7/003; G01B 7/02; G01B 17/00; G01D 5/14; G01D 5/145; G01D 11/24; G01D 11/245; G01D 5/485; G01F 23/2963
See application file for complete search history.

(56) References Cited

U.S. PATENT DOCUMENTS

| 2006/0228062 | A1 | 10/2006 | Nagata et al. |
| 2014/0077794 | A1 | 3/2014 | Takiguchi et al. |
| 2015/0061657 | A1 | 3/2015 | Takiguchi et al. |
| 2015/0177025 | A1* | 6/2015 | Mizunuma ........... G01D 11/245 324/207.25 |
| 2018/0191221 | A1 | 7/2018 | Kouno et al. |

* cited by examiner

*Primary Examiner* — Jermele M Hollington
*Assistant Examiner* — Suresh K Rajaputra
(74) *Attorney, Agent, or Firm* — Nixon & Vanderhye P.C.

(57) ABSTRACT

A position detection device includes a magnetic detection element, a wiring, a first component and a second component as a first mold resin, a terminal, and a sensor cover as a second mold resin. The magnetic detection element can detect a change in magnetic field. The wiring is connected to the magnetic detection element. The first component and the second component mold the magnetic detection element and the wiring so that the wiring is exposed. The terminal is connected to the wiring. The sensor cover molds the first component, the second component and the terminal so that the first component and the second component where the magnetic detection element is located are exposed, and has a deformation suppressing portion. The deformation suppressing portion suppresses the deformation of the first component or the second component when the sensor cover is deformed.

7 Claims, 12 Drawing Sheets

POSITION DETECTION DEVICE

CROSS REFERENCE TO RELATED APPLICATIONS

This application is a continuation application of International Patent Application No. PCT/JP2019/011424 filed on Mar. 19, 2019, which designated the U.S. and based on and claims the benefits of priority of Japanese Patent Application No. 2018-071471 filed on Apr. 3, 2018. The entire disclosure of all of the above applications is incorporated herein by reference.

TECHNICAL FIELD

The present disclosure relates to a position detection device.

BACKGROUND

A position detection device detects a rotation angle of a throttle valve included in an electronic control throttle used in a vehicle or the like, a rotation angle of an accelerator pedal included in an accelerator pedal module, or a stroke amount of a clutch actuator.

SUMMARY

An object of the present disclosure is to provide a position detection device that improves the accuracy of position detection.

The position detection device of the present disclosure includes a magnetic detection element, wiring, a first mold resin, a terminal, and a second mold resin. The magnetic detection element can detect a change in magnetic field. The wiring is connected to the magnetic detection element. The first mold resin molds the magnetic detection element and the wiring so that the wiring is exposed. The terminal is connected to the wiring.

The second mold resin molds the first mold resin and the terminal so that the first mold resin on which the magnetic detection element is located is exposed, and has a deformation suppressing portion. The deformation suppressing portion suppresses the deformation of the first mold resin when the second mold resin is deformed.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Several embodiments of a position detection device will be described below with reference to the drawings. In the description of the plurality of embodiments, substantially the same configuration is denoted by the same reference numeral. When referred to as the present embodiment, a plurality of embodiments may be included. A position detection device according to the present embodiment is used, for example, in an electronic control throttle 81 that controls the amount of air taken into a cylinder of an engine of a vehicle. First, the electronic control throttle 81 will be described.

Figure 1:
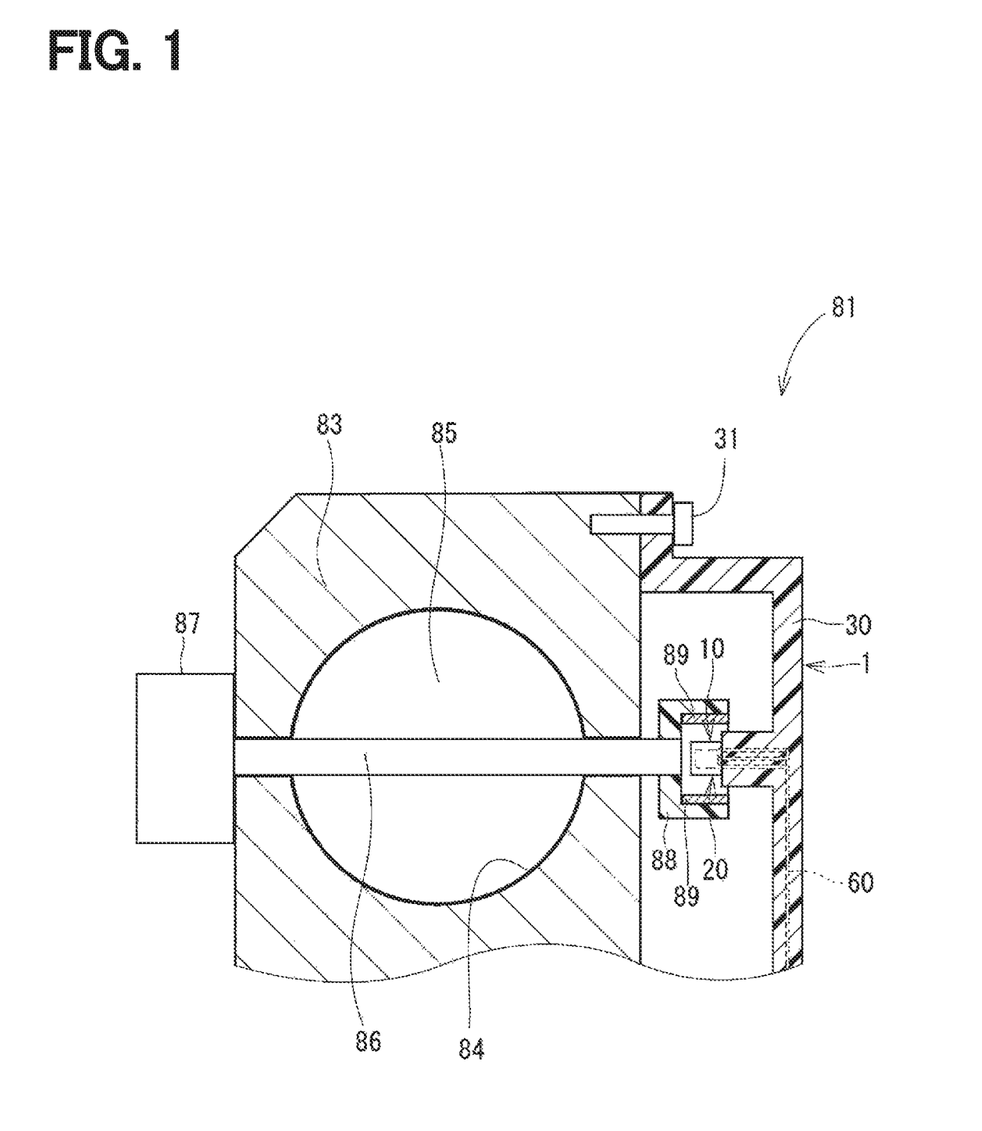
FIG. 1 is a cross-sectional view of an electronic control throttle in which a position detection device according to the present embodiment is used.

As shown in FIG. 1, the electronic control throttle 81 includes a housing 83, an intake passage 84, a throttle valve 85, a valve shaft 86, a motor 87, a holder 88 and magnets 89. The intake passage 84 for introducing air into the engine is formed in the housing 83. The throttle valve 85 is formed in a disc shape and is provided in the intake passage 84.

The valve shaft 86 is fixed to the throttle valve 85. Both ends of the valve shaft 86 are connected to the motor 87 and the holder 88 so as to be rotatable with respect to the housing 83. As a result, the throttle valve 85 can rotate about the center of the valve shaft 86 as a rotation axis. The motor 87 is connected to one end of the valve shaft 86. The motor 87 is drive-controlled by a command from an electronic control unit (ECU) of the engine (not shown). The opening of the throttle valve 85 is controlled by driving the motor 87, and the amount of intake air supplied to the engine is adjusted.

The holder 88 is formed in a cylindrical shape with a bottom, and is provided at the other end of the valve shaft 86. Two magnets 89 as a magnetism generating means, and two yokes (not shown) that connect the two magnets 89 in a circumferential direction are provided on an inner wall of the holder 88. The two magnets 89 are provided so as to face in the radial direction with respect to the rotation axis of the throttle valve 85. The two magnets 89 respectively give an N-pole magnetic flux to one yoke and an S-pole magnetic flux to the other yoke. A magnetic flux flows inside the holder 88 from one yoke to the other yoke, whereby a magnetic field in which the magnetic flux flows in a direction perpendicular to the rotation axis of the throttle valve 85 is generated. When the throttle valve 85 rotates, the direction of the magnetic field inside the holder 88 changes. A position detection device 1 is provided on the holder side of the housing 83.

First Embodiment

The position detection device 1 includes a sensor cover 30 as a second mold resin, a first component 10 and a second component 20 as a first mold resin, and two terminals 60.

Figure 2:
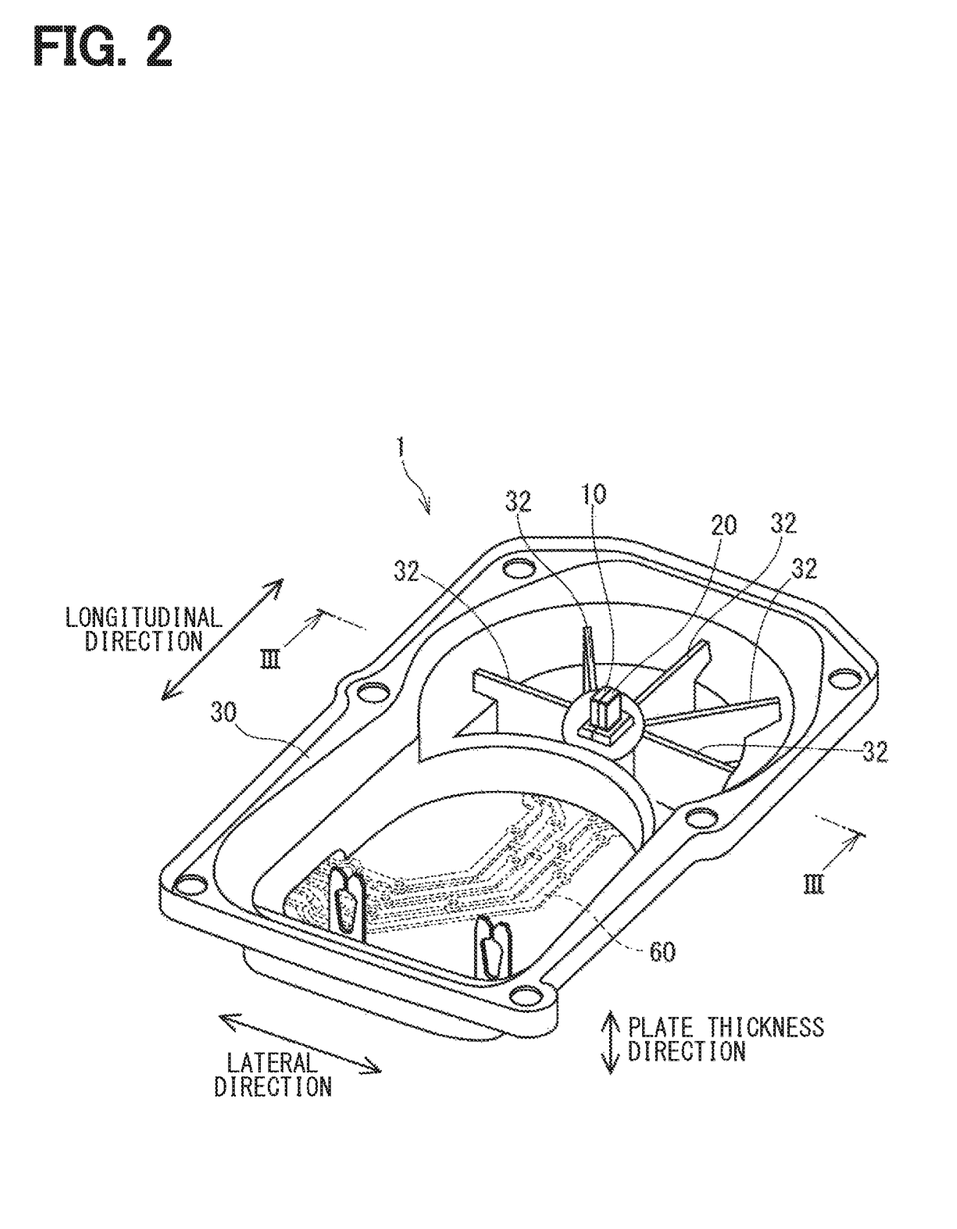
FIG. 2 is a perspective view of a position detection device according to a first embodiment.

As shown in FIG. 2, the sensor cover 30 is made of resin in a dish shape or a plate shape, and is fixed to the housing 83 by screws 31 or the like. The sensor cover 30 integrally molds the first component 10, the second component 20, and the terminals 60 so that the first component 10 on which the first magnetic detection element 11 is located is exposed and the second component 20 on which the second magnetic detection element 21 is located is exposed.

Further, the sensor cover 30 supports the first component 10 and the second component 20, and has a plurality of ribs 32. The rigidity of the sensor cover 30 is improved by the plurality of ribs 32. Hereinafter, a longitudinal direction of the sensor cover 30 will be simply referred to as a longitudinal direction. A lateral direction of the sensor cover 30 will be simply referred to as a lateral direction. A plate thickness direction of the sensor cover 30 is simply referred to as a plate thickness direction.

Figure 3:
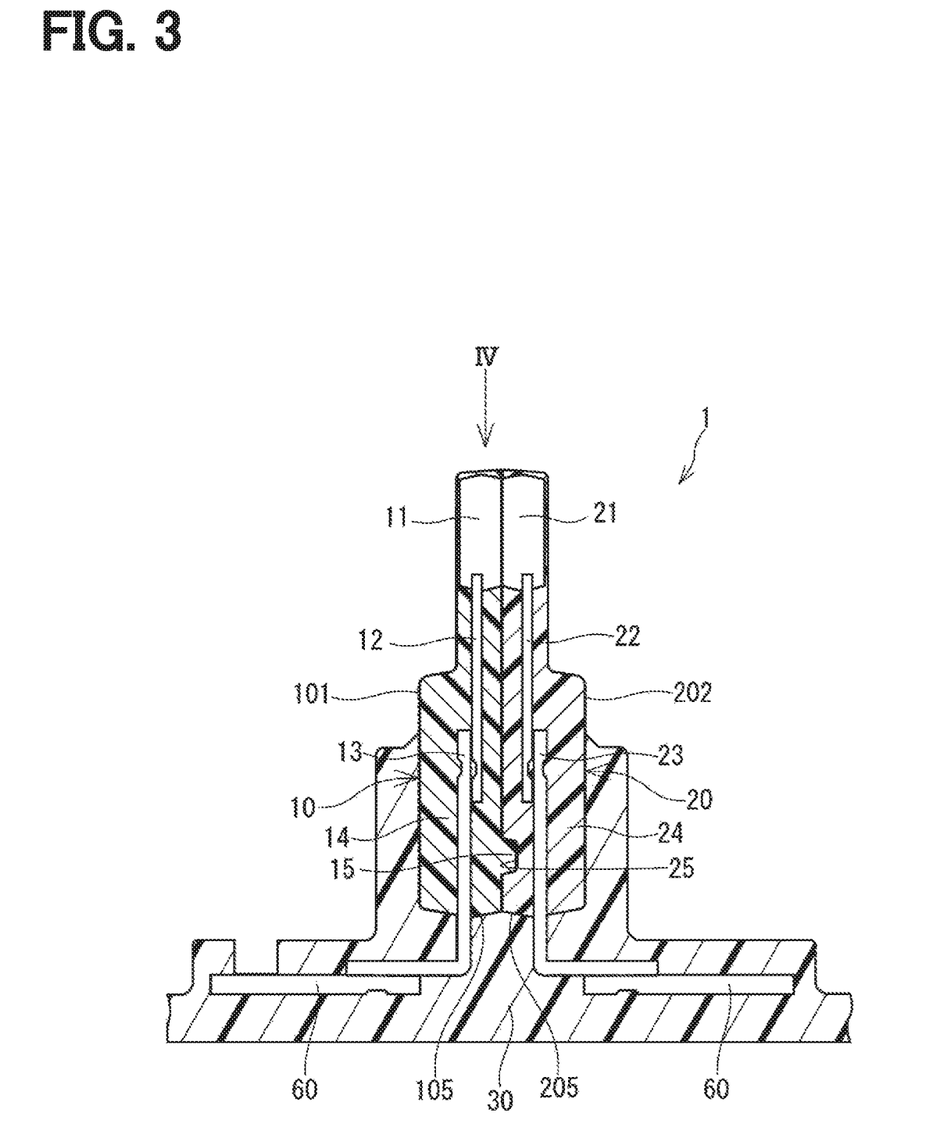
FIG. 3 is a cross-sectional view taken along line III-Ill of FIG. 2 showing a main part.

As shown in FIG. 3, the first component 10 has a first magnetic detection element 11 as a magnetic detection element, a first lead wire 12, a first wiring 13, a first resin portion 14 and a first convex portion 15. The first component 10 molds the first magnetic detection element 11, the first lead wire 12 and the first wiring 13 with resin so that the first wiring 13 is exposed.

The first magnetic detection element 11 is a Hall element and is integrated with the signal amplification circuit. The first magnetic detection element 11 can detect a change in magnetic field. When the throttle valve 85 rotates, the first magnetic detection element 11 detects a change in the magnetic field inside the holder 88.

The first lead wire 12 is connected to the first magnetic detection element 11, and is connected to the first wiring 13 by welding. The first wiring 13 is provided so that the end portion of the first wiring 13 on the side opposite to the first lead wire 12 is exposed from the first resin portion 14. The first convex portion 15 is formed on the surface that contacts the second component 20, and projects toward a second concave portion 25. Further, the first convex portion 15 is formed in a tapered shape so that an outer diameter becomes smaller toward a tip.

The second component 20 is formed in the same manner as the first component 10, and includes a second magnetic detection element 21, which is a magnetic detection element, a second lead wire 22, a second wiring 23, a second resin portion 24, and a second concave portion 25. Like the first component 10, the second component 20 molds the second magnetic detection element 21, the second lead wire 22, and the second wiring 23 with resin so that the second wiring 23 is exposed.

The second magnetic detection element 21 is a Hall element like the first magnetic detection element 11, and is integrated with the signal amplification circuit. The second magnetic detection element 21 can detect a change in magnetic field. When the throttle valve 85 rotates, the second magnetic detection element 21 detects a change in the magnetic field inside the holder 88.

The second lead wire 22 is connected to the second magnetic detection element 21, and is connected to the second wiring 23 by welding. The second wiring 23 is provided so that the end portion of the second wiring 23 on the side opposite to the second lead wire 22 is exposed from the second resin portion 24.

The second concave portion 25 is formed on the surface that comes into contact with the first component 10, and is concave corresponding to the first convex portion 15. The first convex portion 15 and the second concave portion 25 are fitted to each other, and the first component 10 and the second component 20 couple together.

The terminal 60 is connected to the first wiring 13 on the side opposite to a place to which the first lead wire 12 is connected and the second wiring 23 on the side opposite to a place to which the second lead wire 22 is connected, respectively. The first component 10 and the second component 20 are provided in the magnetic field inside the holder 88. The first component 10 and the second component 20 output a voltage signal according to the magnetic flux density passing through the first component 10 and the second component 20 according to the direction of the magnetic field in the holder 88. This voltage signal is transmitted to the ECU through the terminal 60 molded in the sensor cover 30. The ECU controls each part of the vehicle.

Figure 12:
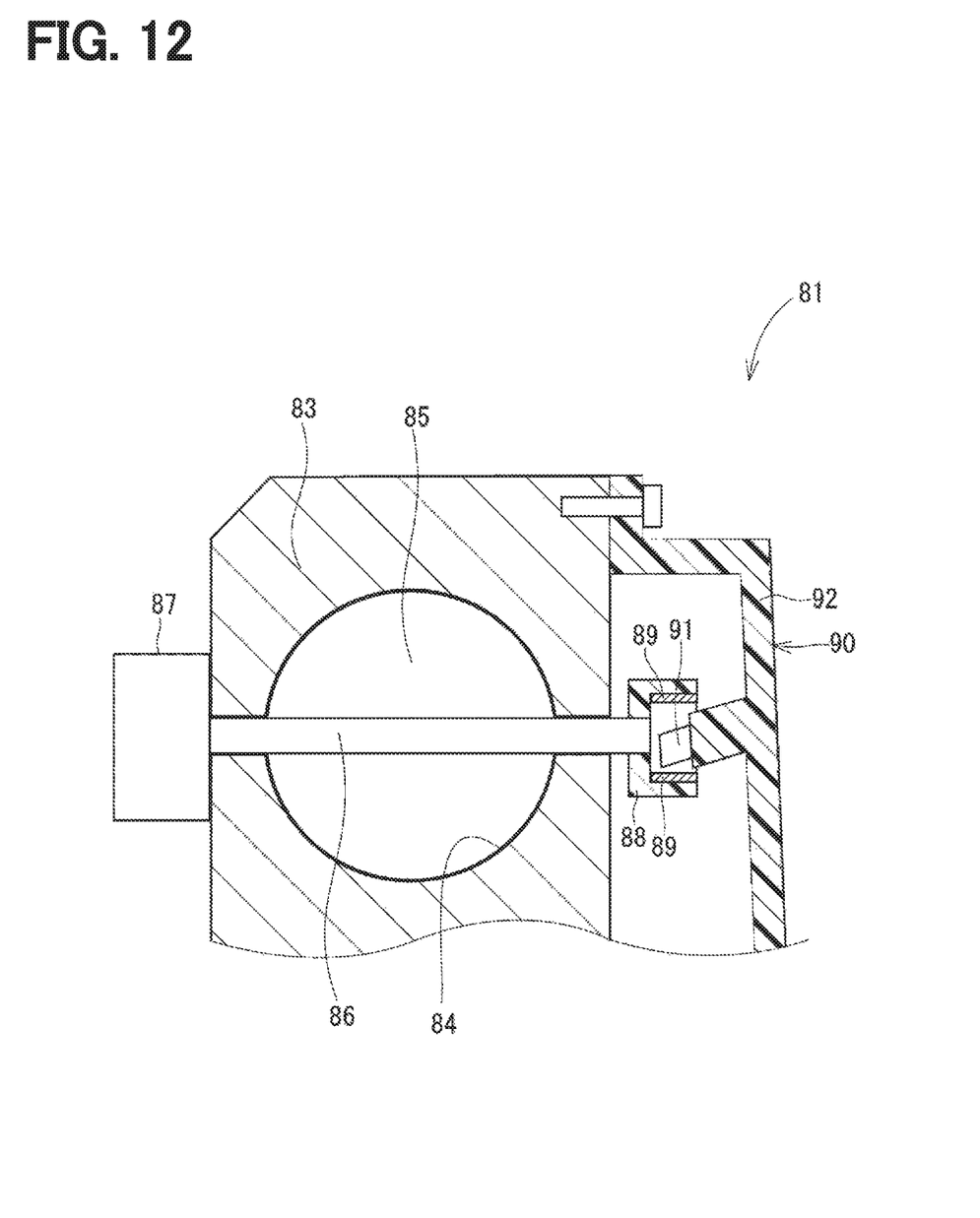
FIG. 12 is a cross-sectional view of an electronic control throttle in which a position detection device of a comparative example is used.

As shown in FIG. 12, in the position detection device 90 of a comparative example, a primary molded article 91 having the magnetic detection element is fixed to a secondary molded article 92. In a temperature environment used for a vehicle or the like, the secondary molded article may be deformed due to linear expansion. When the secondary molded article 92 is deformed, the primary molded article 91 warps and the position of the primary molded article 91 is displaced. When a position of the primary molded article 91 deviates, the position of the magnetic detection element deviates from a magnetic circuit formed by the position detection device 90, so that the position detection accuracy of the position detection device 90 deteriorates. On the other hand, in the position detection device 1 of the present embodiment, an accuracy of the position detection is improved.

Figure 4:
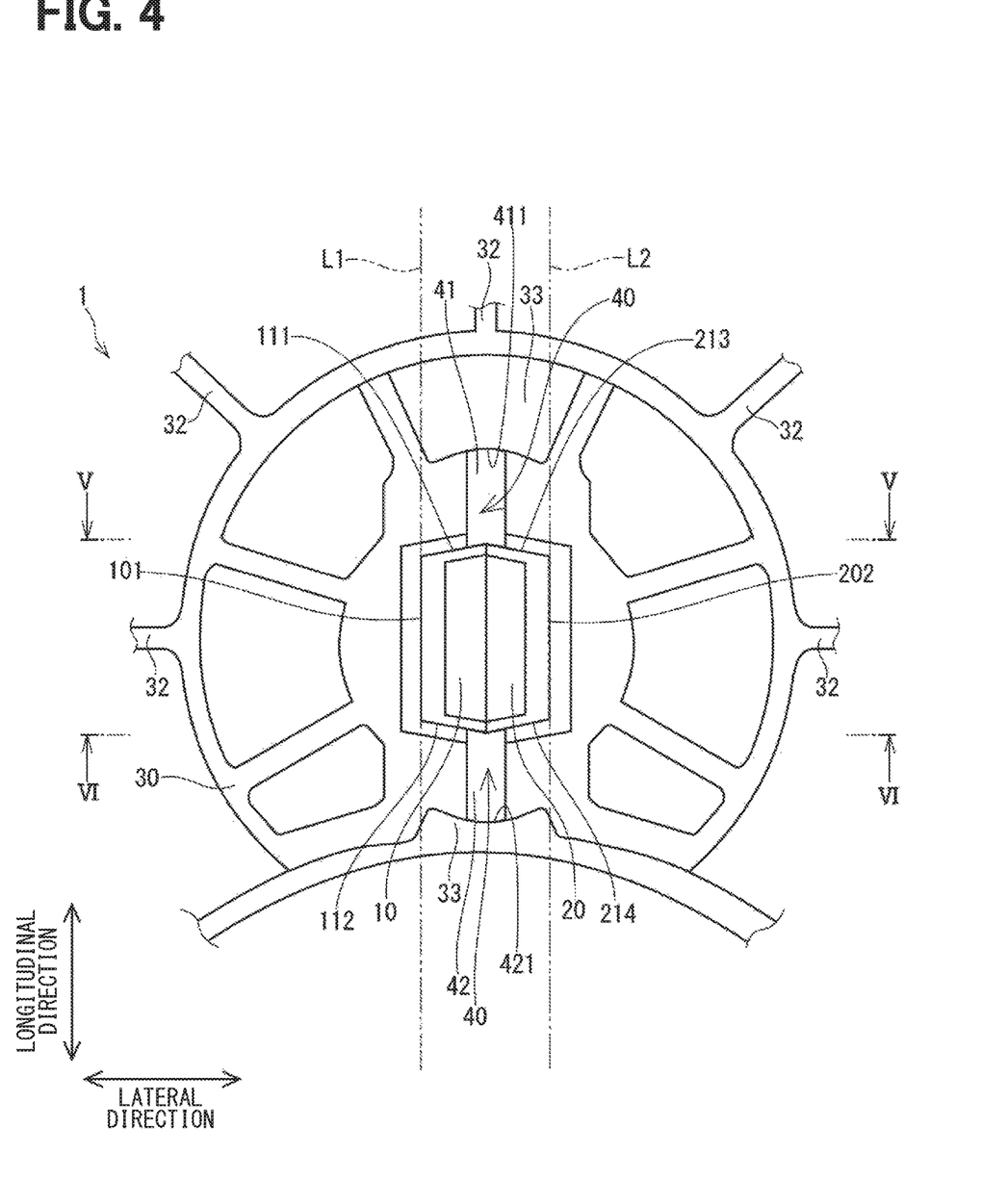
FIG. 4 is a view viewed from a direction IV of FIG. 3.
Figure 5:
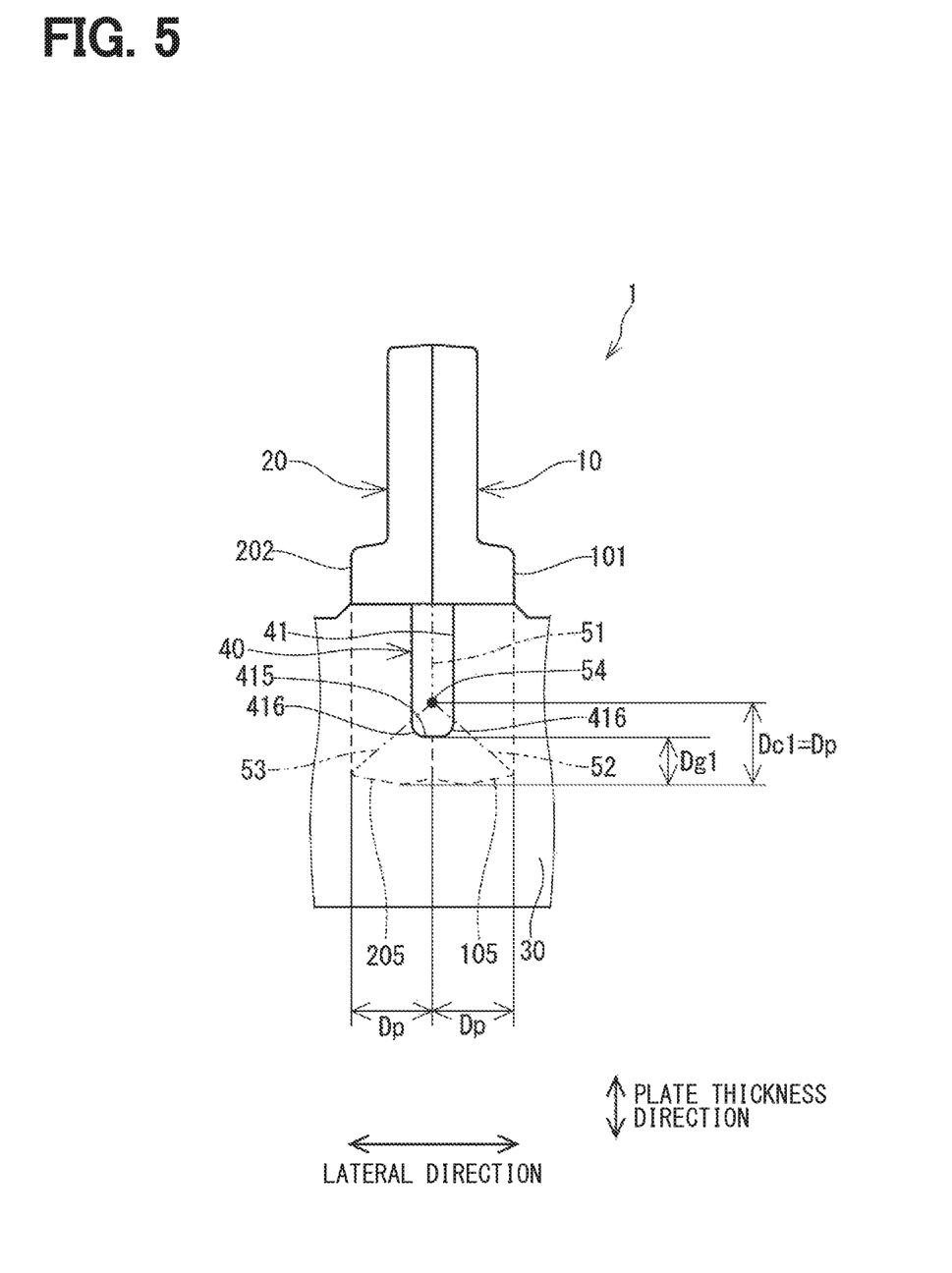
FIG. 5 is a cross-sectional view taken along line V-V of FIG. 4 showing a main part.

As shown in FIGS. 4 and 5, the sensor cover 30 further includes a step portion 33, a deformation suppressing portion 40, a first weld line 51, a second weld line 52, and a third weld line 53 as a weld line.

An outermost one end surface of the first component 10 extending in the longitudinal direction is referred to as a first end surface 101. A straight line passing through the first end surface 101 and extending in the longitudinal direction is referred to as a first straight line L1. An outermost one end surface of the second component 20 extending in the longitudinal direction is referred to as a second end surface 202. The second end surface 202 is provided on the side opposite to the first end surface 101. A straight line that passes through the second end surface 202 and extends in the longitudinal direction is referred to as a second straight line L2. In the figure, the first straight line L1 and the second straight line L2 are indicated by alternate long and two short dashes lines.

One side surface of the first component 10 adjacent to the first end surface 101 is referred to as a first side surface 111. A side surface of the first component 10 opposite to the first side surface 111 is referred to as a second side surface 112. One side surface of the second component 20 adjacent to the second end surface 202 is referred to as a third side surface 213. A side surface of the second component 20 opposite to the third side surface 213 is referred to as a fourth side surface 214. The first side surface 111 is adjacent to the third side surface 213. The second side surface 112 is adjacent to the fourth side surface 214.

The step portion 33 is formed at a position where the first straight line L1 and the second straight line L2 pass. A plurality of step portions 33 are formed and have a convex shape or a concave shape so that the plate thickness of the sensor cover 30 becomes large or small.

One step portion 33 is formed on the first side surface 111 or the third side surface 213 side. The step portion 33 on the first side surface 111 side or the third side surface 213 side is formed so that the plate thickness of the sensor cover 30 is increased. Further, one step portion 33 is formed on the second side surface 112 side or the fourth side surface 214 side. The step portion 33 on the second side surface 112 side or the fourth side surface 214 side is formed so that the plate thickness of the sensor cover 30 is decreased.

The deformation suppressing portion 40 suppresses the deformation of the first component 10 or the second component 20 when the sensor cover 30 is deformed. Further, the deformation suppressing portion 40 includes a first groove portion 41 and a second groove portion 42. One first groove portion 41 is formed on the first side surface 111 side or the third side surface 213 side. One second groove portion 42 is formed on the second side surface 112 side or the fourth side surface 214 side.

The first groove portion 41 and the second groove portion 42 extend in the longitudinal direction while being recessed in a plate thickness direction. Further, the first groove portion 41 extends in the longitudinal direction from the first side surface 111 or the third side surface 213 to the step portion 33. The second groove portion 42 extends in the longitudinal direction from the second side surface 112 or the fourth side surface 214 to the step portion 33.

Further, the first groove portion 41 and the second groove portion 42 are formed between the first straight line L1 and the second straight line L2. The outer edges of the first groove portion 41 and the second groove portion 42 may be located on the first straight line L1 or the second straight line L2. In addition, the first groove portion 41 includes a first facing surface 411 that faces the first side surface 111 or the third side surface 213. The second groove portion 42 includes a second facing surface 421 that faces the second side surface 112 or the fourth side surface 214.

As shown in FIG. 5, the first groove portion 41 includes a first groove portion bottom surface 415 that is a bottom surface of the first groove portion 41. The first groove portion bottom surface 415 is adjacent to the first facing surface 411. Further, the first groove portion 41 is formed such that the outer edge of the first corner portion 416 of the first groove portion bottom surface 415 is curved in the cross section in the plate thickness direction.

Figure 6:
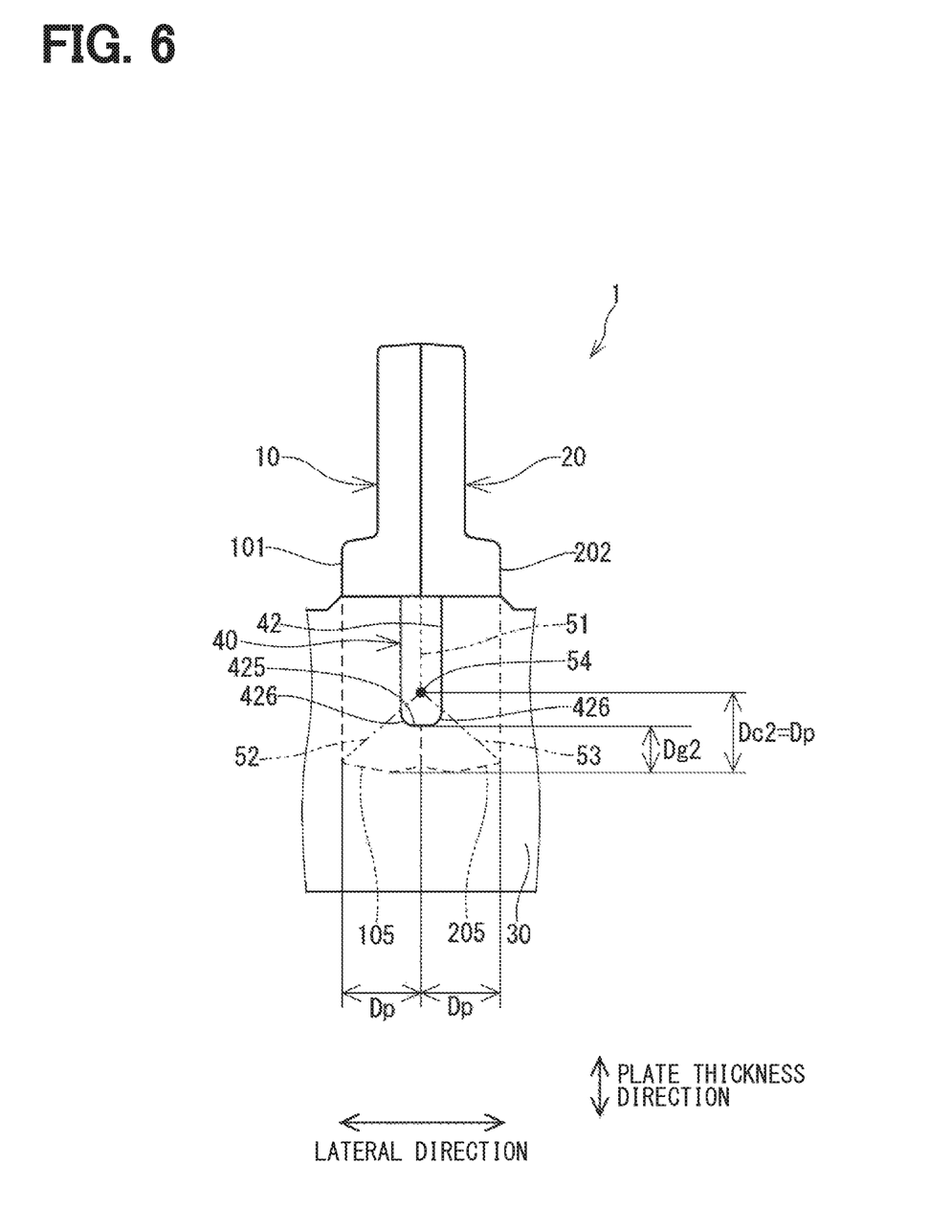
FIG. 6 is a cross-sectional view taken along line VI-VI of FIG. 4 showing a main part.

As shown in FIG. 6, the second groove portion 42 includes a second groove portion bottom surface 425 that is the bottom surface of the second groove portion 42. The second groove portion bottom surface 425 is adjacent to the second facing surface 421. Further, the second groove portion 42 is formed such that the outer edge of the second corner portion 426 of the second groove portion bottom surface 425 is curved in the cross section in the plate thickness direction. In FIGS. 5 and 6, hatching of the cross section of the sensor cover 30 is omitted to clarify each part.

As shown in FIGS. 5 and 6, an end surface of the first component 10 on the terminal 60 side is referred to as a first component bottom surface 105. The first component bottom surface 105 is adjacent to the first end surface 101, the first side surface 111, and the second side surface 112. An end surface of the second component 20 on the terminal 60 side is referred to as a second component bottom surface 205. The second component bottom surface 205 is adjacent to the second end surface 202, the third side surface 213, and the fourth side surface 214. The first component bottom surface 105 is adjacent to the second component bottom surface 205. A maximum length of each of the first component 10 and the second component 20 in a lateral direction is referred to as a component width Dp.

The first weld line 51, the second weld line 52, and the third weld line 53 are lines generated when the molten resin merges when the sensor cover 30 is resin-molded. In the present embodiment, the molten resin flows and merges in two directions in the lateral direction and one direction in the plate thickness direction. A point where the first weld line 51, the second weld line 52, and the third weld line 53 intersect is defined as a merging point 54. In the figure, the positions of the first weld line 51, the second weld line 52, and the third weld line 53 are indicated by alternate long and two short dashes lines. Further, in the figure, the merging point 54 is indicated by a black circle.

The first weld line 51 extends from the merging point 54 in the plate thickness direction. The second weld line 52 is formed on the first component 10 side and extends from the merging point 54 toward the corner of the first component 10 on the terminal 60 side. The third weld line 53 is formed on the second component 20 side and extends from the merging point 54 toward the corner of the second component 20 on the terminal 60 side.

A distance from the first component bottom surface 105 or the second component bottom surface 205 to the first groove portion bottom surface 415 is defined as a first groove portion distance Dg1. A distance from the first component bottom surface 105 or the second component bottom surface 205 to the merging point 54 is defined as a first merging distance Dc1. The first merging distance Dc1 is equal to the component width Dp, that is, Dc1=Dp. In the present specification, "equal" includes a common error range. The first groove portion 41 is formed such that the first merging distance Dc1 is larger than the first groove portion distance Dg1, that is, Dc1>Dg1.

Similarly to the first groove portion 41, a distance from the first component bottom surface 105 or the second component bottom surface 205 to the second groove portion bottom surface 425 is defined as a second groove portion distance Dg2. A distance from the first component bottom surface 105 or the second component bottom surface 205 to the merging point 54 is defined as a second merging distance Dc2. The second merging distance Dc2 is equal to the component width Dp and the first merging distance Dc1, that is, Dc1=Dc2=Dp. The second groove portion 42 is formed such that the second merging distance Dc2 is larger than the second groove portion distance Dg2, that is, Dc2>Dg2.

[1] When the sensor cover 30 is deformed, the deformation of the first component 10 or the second component 20 is suppressed. Thereby, the warp of the first component 10 and the second component 20 is suppressed, and the displacement of the first component 10 and the second component 20 is suppressed. Therefore, the displacement of the first magnetic detection element 11 and the second magnetic detection element 21 is suppressed. Therefore, the position detection accuracy of the position detection device 1 is improved.

[2] The deformation suppressing portion 40 has the first groove portion 41 and the second groove portion 42. While the amount of resin used for manufacturing is suppressed by the first groove portion 41 and the second groove portion 42, the resin can be spread on the sensor cover 30 around the first component 10 and the second component 20. Since the resin is spread on the sensor cover 30, the rigidity of the sensor cover 30 is increased. Therefore, the sensor cover 30 is less likely to be deformed, and the displacement between the first component 10 and the second component 20 is further suppressed. Therefore, the positional deviation between the first magnetic detection element 11 and the second magnetic detection element 21 is suppressed, and the position detection accuracy of the position detection device 1 is further improved.

[3] The first groove portion 41 is formed such that the first merging distance Dc1 is larger than the first groove portion distance Dg1. The second groove portion 42 is formed such that the second merging distance Dc2 is larger than the second groove portion distance Dg2. As a result, when the sensor cover 30 is resin-molded, the molten resin merges for a short period of time, and the molten resin merges when the temperature of the molten resin is high. Therefore, the strength of the weld portion of the sensor cover 30 is improved. The strength of the sensor cover 30 is improved, and the rigidity of the sensor cover 30 is also improved. Therefore, the positional deviation between the first magnetic detection element 11 and the second magnetic detection element 21 is easily suppressed, and the position detection accuracy of the position detection device 1 is further improved.

[4] The first groove portion 41 is formed such that the outer edge of the first corner portion 416 is curved in the cross section in the plate thickness direction. The second groove portion 42 is formed such that the outer edge of the second corner portion 426 is curved in the cross section in the plate thickness direction. Thereby, when the sensor cover 30 is deformed, the stress in the first groove portion 41 and the second groove portion 42 is dispersed. The stress is dispersed and the sensor cover 30 is less likely to be deformed. The positional deviation between the first magnetic detection element 11 and the second magnetic detection element 21 is easily suppressed, and the position detection accuracy of the position detection device 1 is further improved.

Second Embodiment

Figure 7:
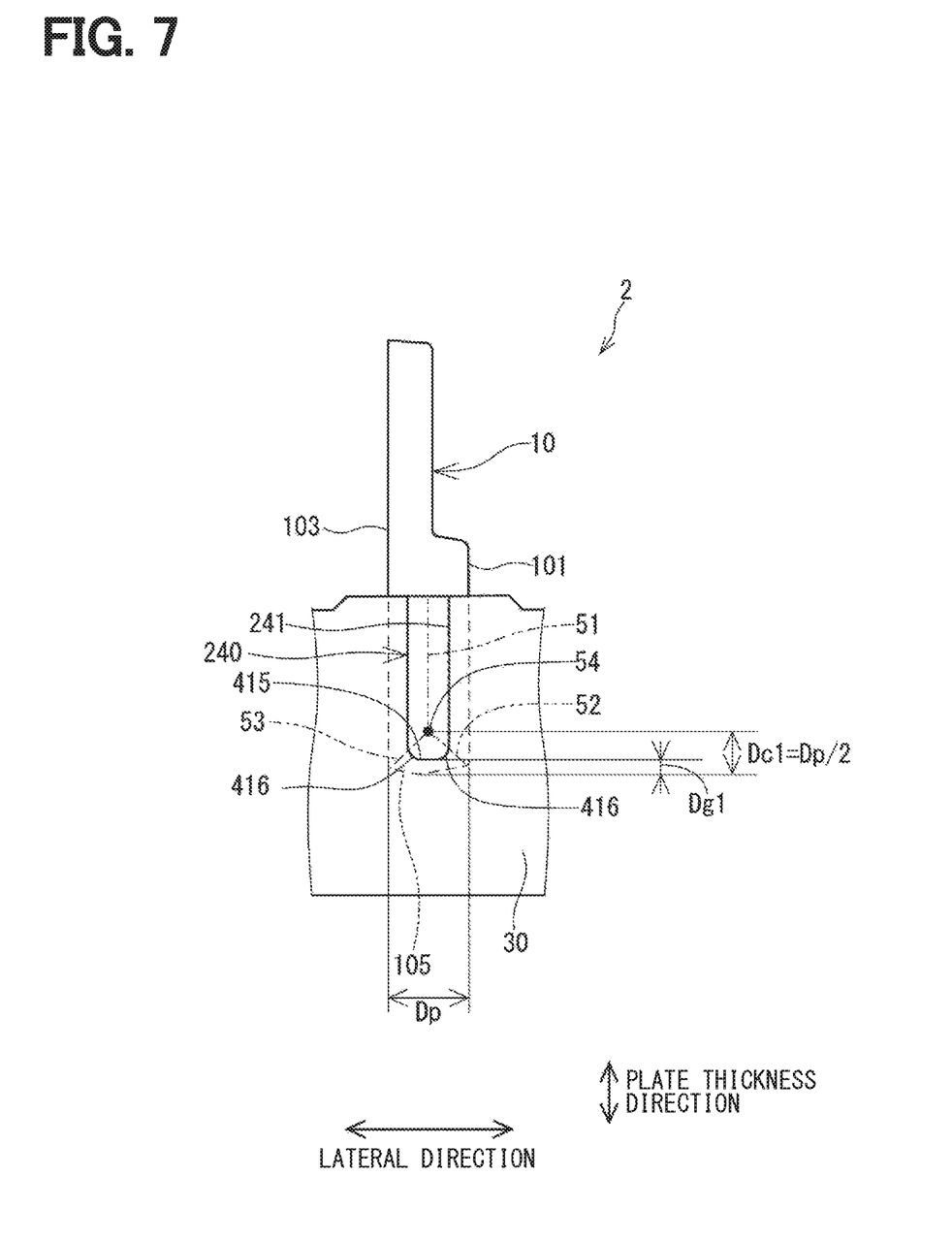
FIG. 7 is a cross-sectional view of a main part of the position detection device according to a second embodiment.
Figure 8:
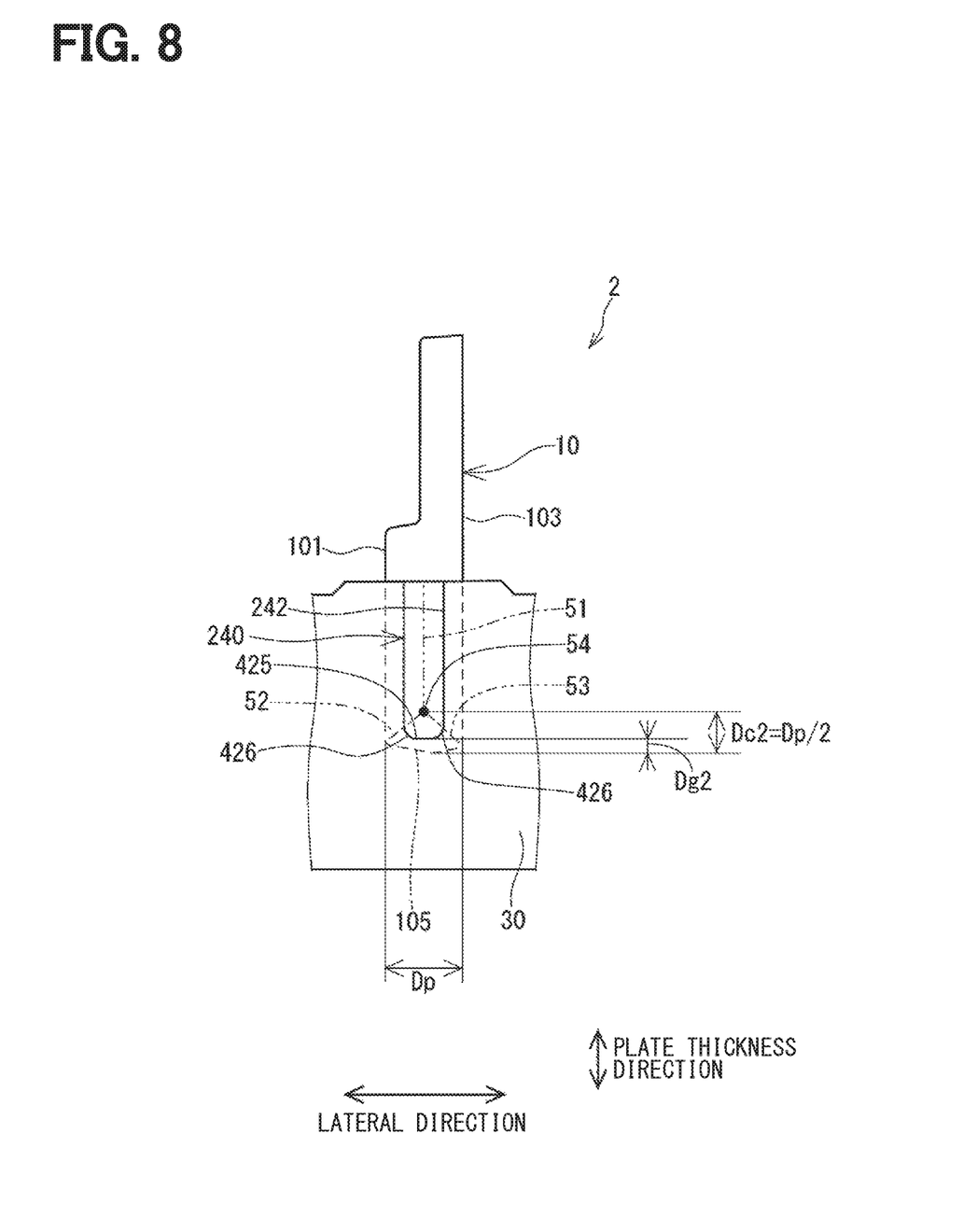
FIG. 8 is a cross-sectional view of the main part of the position detection device according to the second embodiment.

The second embodiment is the same as the first embodiment except that the shape of the deformation suppressing portion is different. The position detection device 2 of the second embodiment does not include the second component 20, but includes the first component 10. The other end surface of the first component 10 opposite to the first end surface 101 is referred to as a third end surface 103. The second weld line 52 is formed on the first end surface 101 side and extends from the merging point 54 toward one corner of the first component 10 on the terminal 60 side. The third weld line 53 is formed on the third end surface 103 side and extends from the merging point 54 toward the other corner of the first component 10 on the terminal 60 side.

As shown in FIGS. 7 and 8, the deformation suppressing portion 240 has a first groove portion 241 and a second groove portion 242. The positions of the first component 10 and the sensor cover 30 are adjusted so that the first merging distance Dc1 is half the component width Dp, that is, Dc1=Dp/2. The positions of the first component 10 and the sensor cover 30 are adjusted so that the second merging distance Dc2 is half the component width Dp, that is, Dc2=Dp/2.

The first groove portion 241 is formed such that the first merging distance Dc1 is larger than the first groove portion distance Dg1, that is, Dp/2>Dg1. The second groove portion 242 is formed such that the second merging distance Dc2 is larger than the second groove portion distance Dg2, that is, Dp/2>Dg2. The second embodiment also achieves the same effects as achieved by the first embodiment.

Other Embodiments

[i] The position detection device of the present embodiment may be used to detect a rotation angle of an accelerator pedal included in an accelerator pedal module. Further, the position detection device of the present embodiment may be used to detect a rotation angle of a tamper control valve. Further, the position detection device of the present embodiment may be used to detect a stroke amount of a clutch actuator.

[ii] The first magnetic detection element 11 and the second magnetic detection element 21 are not limited to Hall elements, and may be MR elements or the like. MR is an abbreviation for Magnet Resistive.

Figure 9:
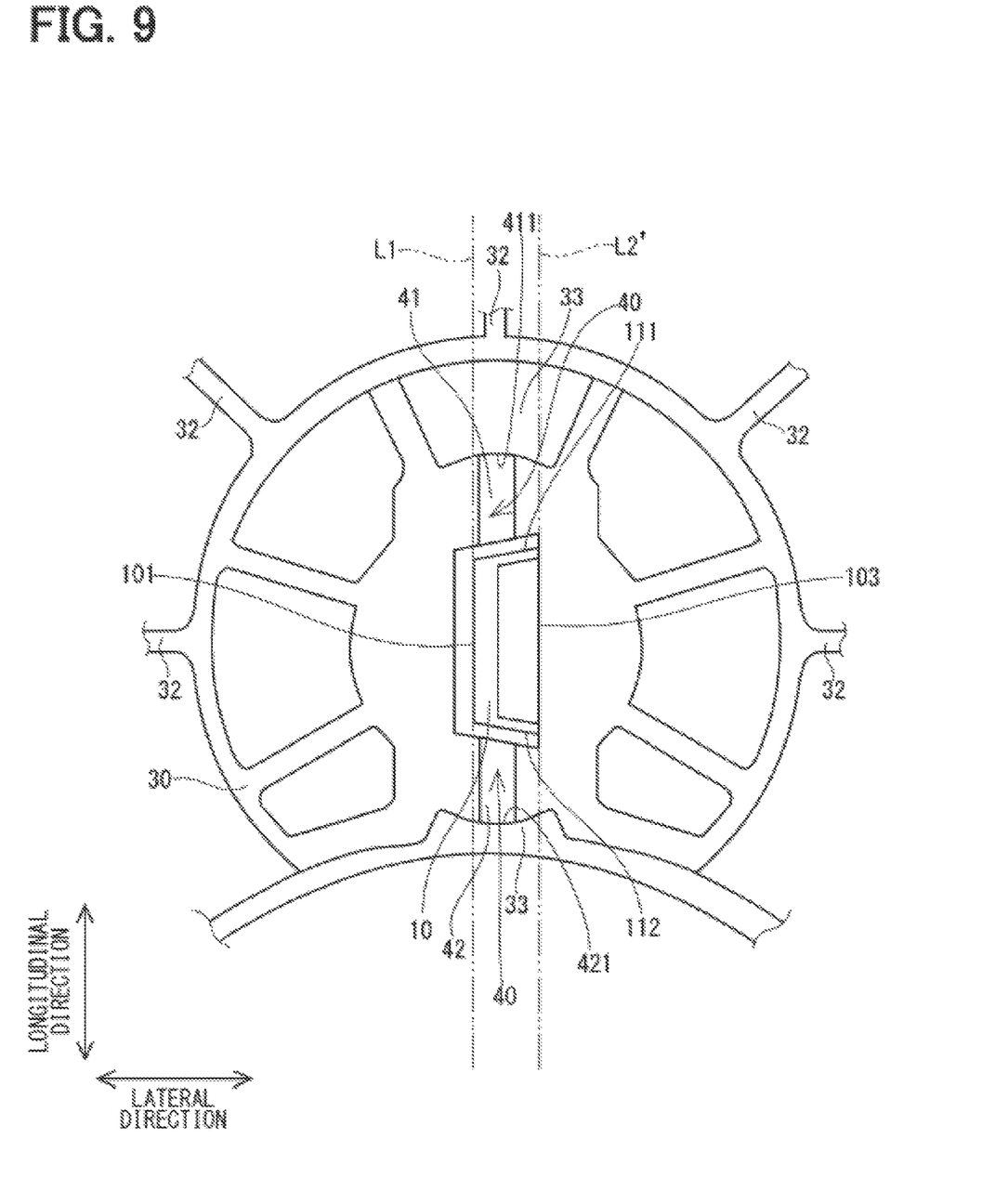
FIG. 9 is a top view of a main part of a position detection device according to another embodiment.

[iii] As shown in FIG. 9, the position detection device 1 of the first embodiment may be configured by one first component 10 without including the second component 20. The first straight line L1 is set on the first end surface 101. The second straight line ' is set on the third end surface 103 on the side opposite to the first end surface 101. The first groove portion 41 and the second groove portion 42 are formed so as to be between the first straight line L1 and the second straight line L2'. Similarly, the position detection device 1 of the present embodiment may not include the first component 10 and may be configured by one second component 20.

[iv] The position detection device 2 of the second embodiment may include the second component 20 instead of the first component 10.

Figure 10:
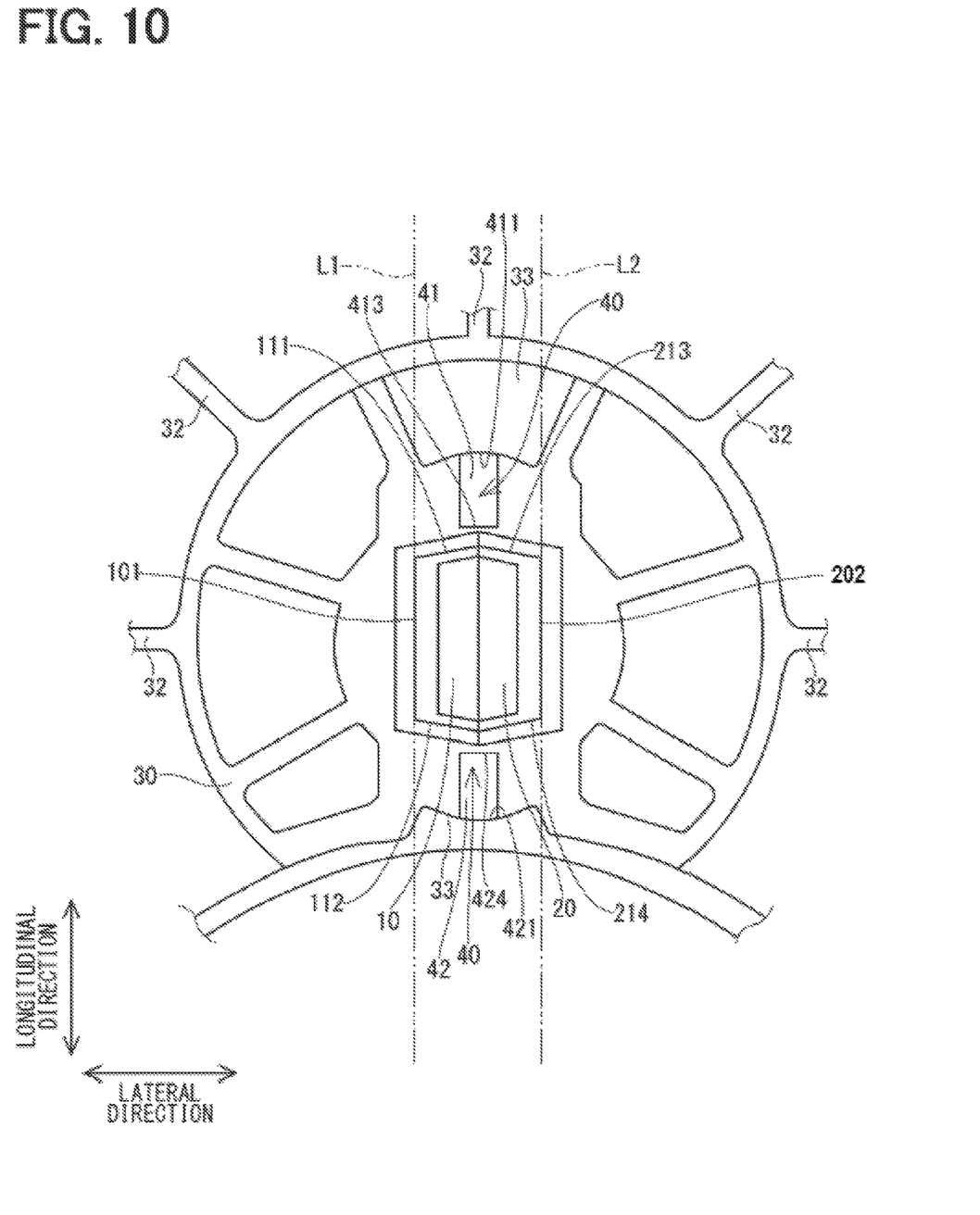
FIG. 10 is a top view of a main part of a position detection device according to another embodiment.

[v] As shown in FIG. 10, the first groove portion 41 and the second groove portion 42 of the deformation suppressing portion 40 in the position detection device 1 of the present embodiment may be separated from the first component 10 and the second component 20. At this time, the first groove portion 41 includes a third facing surface 413 facing the first facing surface 411. The second groove portion 42 includes a fourth facing surface 424 facing the second facing surface 421. The third facing surface 413 is inclined so that the first groove portion 41 becomes smaller toward the first groove portion bottom surface 415. Similarly, the fourth facing surface 424 is inclined so that the second groove portion 42 becomes smaller toward the second groove portion bottom surface 425.

Figure 11:
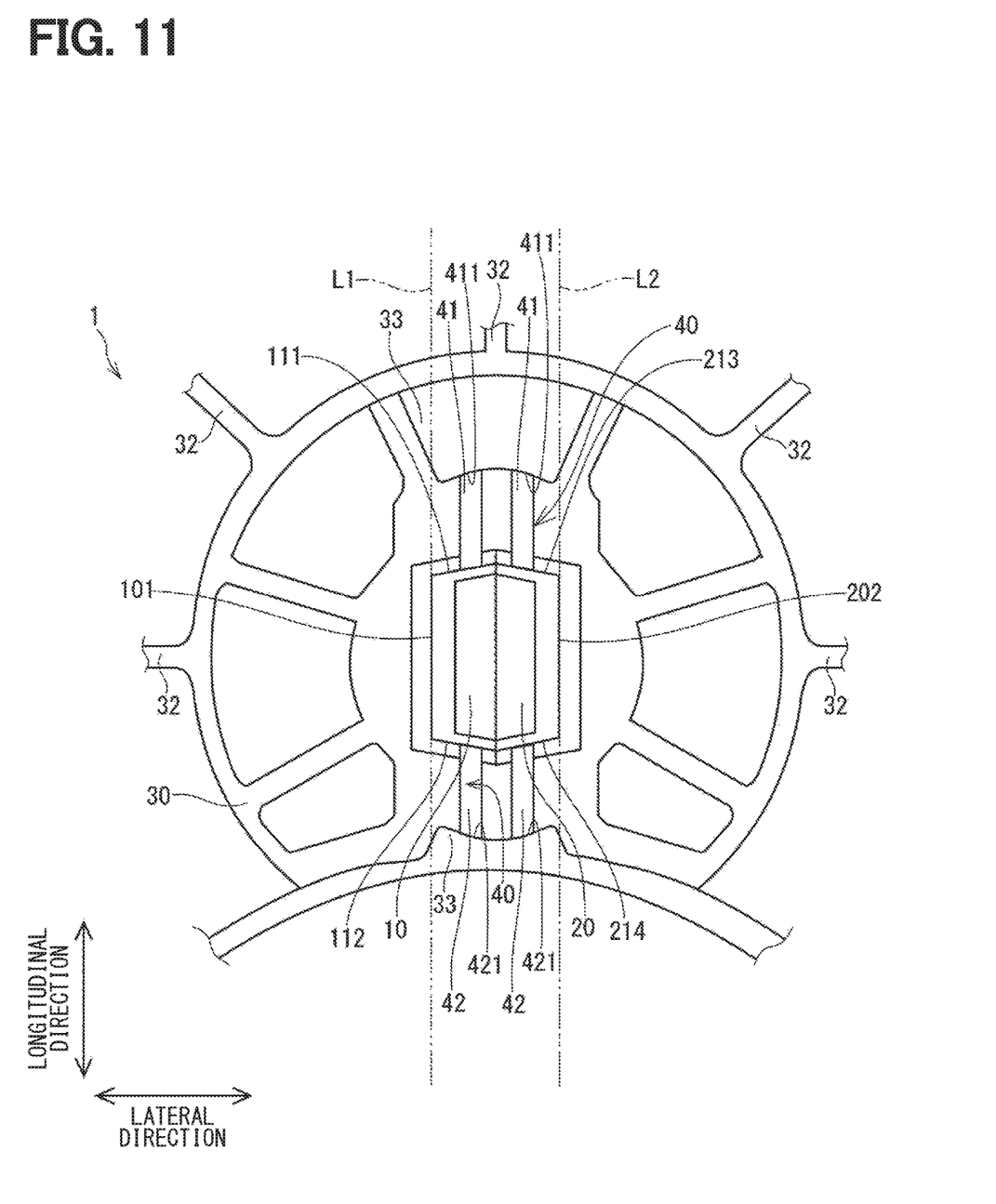
FIG. 11 is a top view of a main part of a position detection device according to another embodiment.

[vi] As shown in FIG. 11, the deformation suppressing portion 40 may have a plurality of first groove portions 41 and second groove portions 42.

The present disclosure should not be limited to the embodiment described above. Various other embodiments may be implemented without departing from the scope of the present disclosure.

The present disclosure has been described based on the embodiments. However, the present disclosure is not limited to the embodiments and structures. This disclosure also encompasses various modifications and variations within the scope of equivalents. Furthermore, various combination and formation, and other combination and formation including one, more than one or less than one element may be made in the present disclosure.

In an assumable example, a position detection device detects a rotation angle of a throttle valve included in an electronic control throttle used in a vehicle or the like, a rotation angle of an accelerator pedal included in an accelerator pedal module, or a stroke amount of a clutch actuator. Further, in the position detection device, a primary molded article obtained by primary molding a magnetic detection element and a wiring is connected to a terminal, and the primary molded article and the terminal are secondary molded.

In the example, the primary molded article is fixed to the secondary molded article. In a temperature environment used for a vehicle or the like, the secondary molded article of the position detection device may be deformed due to linear expansion. When the secondary molded article is deformed, the primary molded article warps and the position of the primary molded article is displaced. When a position of the primary molded article deviates, the position of the magnetic detection element deviates from a magnetic circuit formed by the position detection device, so that the position detection accuracy of the position detection device deteriorates. An object of the present disclosure is to provide a position detection device that improves the accuracy of position detection.

The position detection device of the present disclosure includes a magnetic detection element, wiring, a first mold resin, a terminal, and a second mold resin. The magnetic detection element can detect a change in magnetic field. The wiring is connected to the magnetic detection element. The first mold resin molds the magnetic detection element and the wiring so that the wiring is exposed. The terminal is connected to the wiring.

The second mold resin molds the first mold resin and the terminal so that the first mold resin on which the magnetic detection element is located is exposed, and has a deformation suppressing portion. The deformation suppressing portion suppresses the deformation of the first mold resin when the second mold resin is deformed.

With this configuration, the warp of the first mold resin is suppressed, and the displacement of the first mold resin is suppressed. Therefore, the displacement of the magnetic detection element is suppressed. Therefore, the position detection accuracy of the position detection device is improved.

What is claimed is:

1. A position detection device, comprising:
   a magnetic detection element configured to detect a change in magnetic field;
   a wiring connected to the magnetic detection element;
   a first mold resin configured to mold the magnetic detection element and the wiring so that the wiring is exposed;
   a terminal connected to the wiring; and
   a second mold resin configured to mold the first mold resin and the terminal so that the first mold resin on which the magnetic detection element is located is exposed, wherein
   the second mold resin has a deformation suppressing portion configured to suppress the deformation of the first mold resin when deformed,
   the deformation suppressing portion is a groove portion extending in a longitudinal direction of the second mold resin while being recessed in a plate thickness direction of the second mold resin,
   a straight line passing through one end surface of the first mold resin and extending in the longitudinal direction of the second mold resin is referred to as a first straight line,
   a straight line passing through the other end surface of the first mold resin on the side opposite to the one end surface of the first mold resin and extending in the longitudinal direction of the second mold resin is referred to as a second straight line, and
   the deformation suppressing portion is formed between the first straight line and the second straight line.

2. The position detection device according to claim 1, wherein
   the groove portion has a facing surface facing a side surface of the first mold resin adjacent to one end surface of the first mold resin or the other end surface of the first mold resin.

3. The position detection device according to claim 2, wherein
   the second mold resin has a step portion so that a plate thickness of the second mold resin is large or small, and
   the groove portion extends in the longitudinal direction of the second mold resin from the side surface of the first mold resin to the step portion.

4. The position detection device according to claim 1, wherein
   the two terminals are provided,
   the first mold resin has a first component and a second component,
   the second mold resin molds the first component and the second component of the first mold resin and the two terminals, and includes a plurality of weld lines and a merging point which merges the weld lines, and
   the groove portion is formed so that a distance from a bottom surface of the first mold resin on the terminal side to the merging point is larger than a distance from the bottom surface of the first mold resin to a bottom surface, which is a bottom surface of the groove portion.

5. The position detection device according to claim 1, wherein
   the one terminal is provided,
   the first mold resin has a first component,
   the second mold resin molds the first component of the first mold resin and the terminal, and includes a plurality of weld lines and a merging point which merges the weld lines, and
   the groove portion is formed so that half of a maximum length of the first mold resin in a lateral direction of the second mold resin is larger than a distance from the bottom surface of the first mold resin to a bottom surface, which is a bottom surface of the groove portion.

6. The position detection device according to claim 4, wherein
   the groove portion is formed such that an outer edges of the corner portions on the bottom surface of the groove portion in a section of the second mold resin in the plate thickness direction are curved.

7. The position detection device according to claim 5, wherein
   the groove portion is formed such that an outer edges of the corner portions on the bottom surface of the groove portion in a section of the second mold resin in the plate thickness direction are curved.

* * * * *